(12) United States Patent
Steblina (10) Patent No.: US 6,170,530 B1
(45) Date of Patent: Jan. 9, 2001

(54) SEALING DEVICE (76) Inventor: David Steblina, 23 Bounty Avenue, Castle Hill, NSW (AU), 2154

( * ) Notice: Under 35 U.S.C. 154(b), the term of this patent shall be extended for 0 days.

(21) Appl. No.: 09/367,855
(22) PCT Filed: May 11, 1998
(86) PCT No.: PCT/AU98/00339
 § 371 Date: Oct. 6, 1999
 § 102(e) Date: Oct. 6, 1999
(87) PCT Pub. No.: WO98/51958
 PCT Pub. Date: Nov. 19, 1998

(30) Foreign Application Priority Data

May 9, 1997 (AU) .................................................. PO 6717

(51) Int. Cl.$^7$ .................................................. F16L 55/10
(52) U.S. Cl. .................. 138/89; 138/90; 73/49.8
(58) Field of Search .......................... 138/89, 90, 96 R; 73/49.8

(56) References Cited

U.S. PATENT DOCUMENTS

| 2,773,554 | * | 12/1956 | Lindorf | 138/90 |
| 2,855,003 | * | 10/1958 | Thaxton | 138/90 |
| 3,323,551 | * | 6/1967 | Bell et al. | 138/90 |
| 4,982,763 | * | 1/1991 | Klahn | 138/90 X |
| 5,224,516 | * | 7/1993 | McGovern et al. | 138/90 X |
| 5,660,293 | * | 8/1997 | Strom | 138/90 X |
| 5,676,174 | * | 10/1997 | Berneski, Jr. et al. | 138/90 X |
| 5,797,431 | * | 8/1998 | Adams | 138/90 X |

FOREIGN PATENT DOCUMENTS

| 39127/89 | * | 1/1990 | (AU) . |
| 56349/94 | * | 8/1994 | (AU) . |
| 255398 | * | 3/1988 | (EP) . |
| 2293429 | * | 3/1996 | (GB) . |

* cited by examiner

Primary Examiner—Patrick Brinson
(74) Attorney, Agent, or Firm—Hollander Law Firm, P.L.C.

(57) ABSTRACT

A releasable plug for sealing an open end of a fluid bearing pipe having at its open end an inwardly directed flange formed upon cutting an end of said pipe; said plug including a plug body, an annular recess formed in the body which engages said flange, and sealing means which frictionally engages an inner surface of said pipe thereby providing a pressure seal for said pipe.

23 Claims, 5 Drawing Sheets

SEALING DEVICE

BACKGROUND

The present invention relates to pipe sealing devices and more particularly, relates to an improved sealing device for the temporary sealing of pipe ends and a method of installation of such device. Although the invention will be described in respect of its application to plumbing pipes it will be appreciated by those skilled in the art that the invention may be applied to piping in other fields.

PRIOR ART

There are numerous devices in the marketplace which are used for temporary and permanent sealing of fluid bearing pipes. Broadly these can be divided into two categories. The first comprises end covers or dust caps which are placed over the ends of pipes to prevent ingress of foreign particles and which have no pressure resistant capabilities. The second category of devices are those which have the capacity to seal pipes bearing pressurised fluids and these generally comprise pneumatic or mechanical devices with the former relying on air pressure to urge a resilient deformable member against the walls or end of a pipe to thereby effect sealing. Another example of sealing devices is a solenoid wherein a plastics material actuated electrically, mechanically engages the end of a pipe thereby effecting the seal, even where the pipe bears a pressurised fluid.

U.S. Pat. No. 3,704,729 for example which falls in the second category above discloses a plumbing device for plugging a pipe including a radially expansible rubber sleeve disposed about an end of an axial shaft or tube. Devices such as this rely on the establishment of a frictional engagement between the expansible rubber sleeve and the internal surface of a pipe to be sealed. However reliance on frictional engagement has the limitation that resistance to blow out is totally reliant on the co-efficient of friction established.

An alternative device for closure of a pipe end falling in the first category is disclosed in U.S. Pat. No. 4,046,168. The plug disclosed in that patent comprises a circular disc portion and an annular skirt projecting from the periphery of the disc portion to one side thereof and a pipe member which projects in the direction of the longitudinal axis of the plug from the centre of the disc portion to one side. This device relies for its engagement and therefore sealing of the pipe on an annular skirt to engage the internal surface of the pipe to be sealed and an abutment member which limits entry of the plug to a predetermined distance along the pipe. Plugs of this nature rely heavily on frictional engagement between the material of the plug and the inner surface of the pipe to be sealed and are also prone to popping out where the pressure in the pipe exceeds the capability of the plug to withstand such pressure even though this is likely to occur at a lower pressure threshold. Plumbers are frequently engaged in installations which require temporary termination of the water service and restoration of the service at the end of the day to prevent interruption to the supply where the work temporarily ceases. Where there is partially completed pipe work the pipe ends must be temporarily sealed (sometimes only overnight until work recommences the next day) necessitating preparation of a seal that will withstand normal operating pressures.

According to prior art methodology, pipes may be sealed temporarily by firstly heating the pipe end with Oxy and Acetylene, squeezing or crimping the heated end closed, followed by brazing the pipe end with silver solder to ensure a sound joint. Another method was to weld on to the end of a cut pipe a preformed thread followed by screwing on a threaded cap or valve.

In pipe reticulation networks the tradesman usually leaves testing the pipes until completion due to the time consuming and thus costly methods of sealing mentioned above. This can result in some networks not being fully and properly tested due to possible rendering over as building work progresses. If leaks are later detected the builder or tradesman must incur the cost of making good the defect. Also, there is a wastage factor in adopting the crimping and brazing method which adds to the cost of piping. This arises from crimping of the pipe which effectively damages a length of pipe which must be later cut off. Plumbers usually cut off the crimped end to restore the open pipe end which causes loss of anywhere between 100–200 mm of pipe depending upon the distance from the crimp the plumber chooses to make the cut.

The present invention seeks to provide a simple alternative to the above sealing methods and devices, and more particularly provides a removable plug and method of insertion thereof for conveniently sealing a pipe without complete reliance on friction between the plug and inner walls of a pipe to be sealed and which precludes the need to temporarily seal a fluid bearing pressure pipe by crimping and welding leading to pipe wastage.

INVENTION

In one broad form the present invention comprises;
a releasable plug for temporarily sealing an open end of a fluid bearing pipe having at its open end an inwardly directed flange formed upon cutting said pipe; said plug comprising;
an elongated shaft including at a first end a threaded region and at a second end a collar;
a sleeve surrounding said elongated shaft and including at one end a collett and at a second end an abutment surface wherein sealing means are provided between said abutment surface and said collar;
and wherein, the sleeve further comprises a recess at or near said collett which receives said flange thereby providing resistance against unwanted release of said plug from said open end of said pipe.

According to a preferred embodiment the sleeve is deformable to allow passage of the plug through the space defined by said annular flange and to allow said annular flange to engage said recess.

Preferably the threaded region receives a nut which when rotated in a first direction engages a surface of the collett urging the sleeve towards the collar on said shaft so that said sealing means is compressed between said sleeve and said collar causing frictional engagement between the plug and an inner surface of the pipe. Preferably the sealing means is a rubber O-ring.

In another broad form the present invention comnprises;
a removable plug for temporarily sealing an open end of a fluid bearing pipe or tube including a flange formed at the mouth of said open end and which projects radially inwards from an inner surface of said pipe or tube; the plug comprising;
a deformable body having disposed peripherally thereabout a recess or groove which when said plug is inserted in said opening receives said flange such that at least one wall of said recess or groove engages either one or both surfaces of the flange and/or the inner surface of the pipe to effect sealing between the plug and pipe.

In its broadest form the present invention comprises;
a releasable plug for sealing an open end of a fluid bearing pipe having at its open end an inwardly directed flange formed upon cutting an end of said pipe; said plug including a plug body, an annular recess formed in the body which engages said flange, and a seal or a sealing device which frictionally engages an inner surface of said pipe thereby providing a pressure seal for said pipe.

According to one embodiment the plug comprises a generally disc shaped body with the recess formed by a bifurcation in the body near the circumferential region said bifurcation terminating in two resiliently deformable wall members such that the disc is generally H shaped in cross section.

The flange on the pipe or tube is formed preferably by means of a roller cutter which enables the formation of a consistent inwardly directed flange of sufficient strength to withstand fluid pressures which will be generated on the plug. The flange width may fall within the range 0.1 mm to 3.0 mm.

According to one embodiment in order to effect sealing of the pipe the outer extremity of the wall of the groove upstream of the flange will frictionally engage the inner surface of the pipe and/or engage the flange. However, unlike the known sealing devices, the plug according to the invention is not totally reliant on frictional engagement between the body of the plug and the inner wall of the pipe due to the additional resistance to popping out provided by the engagement between the plug and the flange via a recess in the plug.

Preferably, the walls of the groove are deformable so as to enable convenient insertion of the plug in the opening of the pipe and particularly so that either one of the walls (depending upon which way the plug is inserted) will clear the outer extremity of the flange before elastically returning to its original configuration.

According to an alternative embodiment the plug includes a finger or hand grippable element enabling convenient removal of the plug or disengagement of the seal. The plug is ideally suited for use with copper or galvanised iron pipes.

According to a method aspect, the present invention comprises;
a method for releasably sealing an end of a pipe comprising the steps of:
  (a) cutting the end of a pipe to be sealed so as to form a flange about the end of the pipe extending radially inwards from an inner surface of the pipe;
  (b) taking a sealing device as herein described;
  (c) inserting the device into an opening in said cut end such that a groove in the device engages said flange thereby sealing the pipe and providing resistance against unwanted expulsion of said sealing device from said pipe end when said pipe contains a pressurised fluid.

According to the method aspect the invention comprises the further step of activating a sealing means included on said plug.

DETAILED DESCRIPTION

The present invention will now be described in more detail with reference to the accompanying illustrations wherein.

Figure 1:
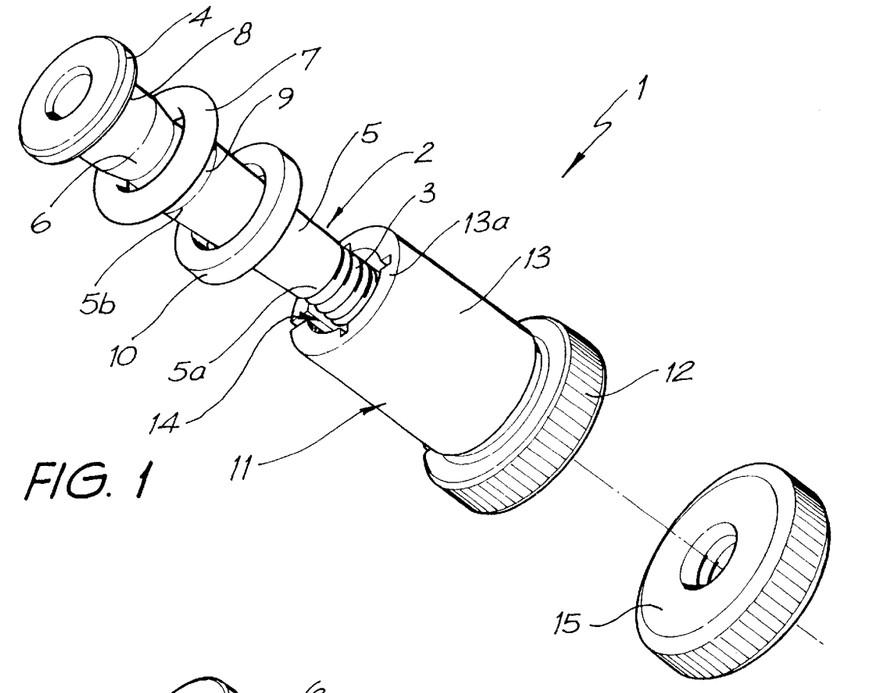
FIG. 1: shows an isometric exploded view of a plug according to a preferred embodiment of the invention.

Referring to FIG. 1 there is shown an exploded view of a sealing plug 1 according to a preferred embodiment of the invention. The plug is adapted for insertion in the open end of a fluid bearing pipe such as but not limited to a water pipe. Plug 1 is capable of sealing a pressure pipe and may be used with pipes of various materials such as copper and plastics. The plug is particularly suited for sealing cut ends of pipes in which there is characteristically formed an inwardly directed flange which results from the cutting instrument.

Plug 1, according to the preferred embodiment, includes an elongated shaft 2 having at one end threaded region 3 and at the opposite end collar 4. Intermediate threaded region 3 and collar 4 resides a tapered region 5 defining a length from the termination point of thread 3 to a recess 6. Tapered region 5 tapers outwardly from end 5a to opposite end 5b. Recess 6 defines a longitudinal length from termination 5b of tapered region 5 to collar 4. Recess 6 receives O ring 7 which, prior to installation of the plug, is free to move between bearing surface 8 of collar 4 and bearing surface 9 which forms a wall of recess 6. Disposed about tapered region 5 is an annular floating collar 10 which in use will engage O ring 7. The internal diameter of floating collar 10 is larger than the largest external diameter along tapered region 5. Plug 1 further comprises an annular sleeve 11 comprising collett 12 and elongated shank 13 integrally connected to the collett. Shank 13 has a through passage 14 which communicates between collett 12 and free end 13a of shank 13. The internal diameter of through passage 14 is greater than the widest external diameter of the tapered region 5 which according to the embodiment described occurs at end 5b. This allows sleeve 11 to float along a longitudinal axis of shaft 2 between O ring 7 and annular locking nut 15, which when plug 1 is in use, threadably engages threaded region 3.

Figure 2:
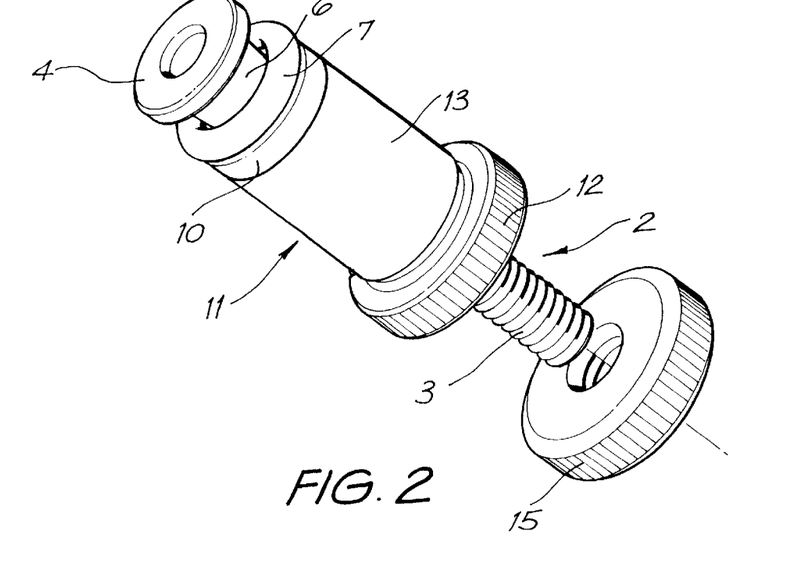
FIG. 2: shows a partially assembled isometric view of the plug of FIG. 1.

Referring to FIG. 2 there is shown a partially assembled isometric view of the plug shown in FIG. 1 with nut 15 exploded from threaded region 3 of shaft 2. FIG. 2 has been numbered corresponding to FIG. 1. Sleeve 11 slides along shaft 2 until it engages floating collar 10 which itself engages O ring 7. Sleeve 11 can be urged in the direction of collar 4 prior to insertion in a pipe to be sealed.

Figures 3, 4:
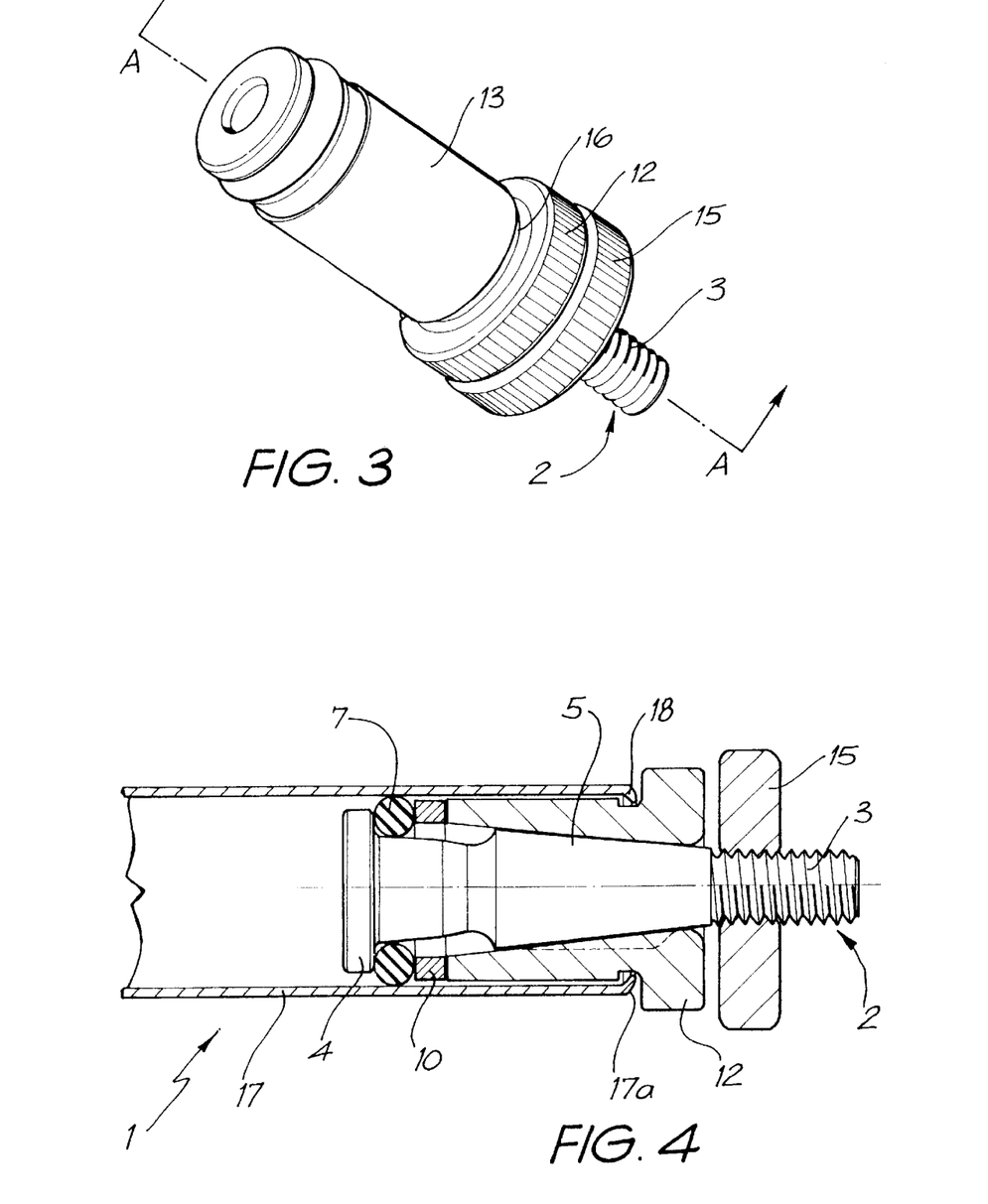
FIG. 3: shows the plug of FIG. 1 fully assembled.
FIG. 4: shows the plug of FIG. 3 fitted to a pipe end with sealing means actuated.

FIG. 3 shows the plug of FIG. 1 fully assembled. In this illustration locking nut 15 is engaged with threaded region of shaft 2. Plug 1 is push inserted into an open end of a pipe to be sealed. In doing so, O ring 7 frictionally engages the inner wall as the O ring is at this time sufficiently loose to allow penetration into the pipe end. Full insertion of the plug into the pipe end causes engagement between a flange formed on a pipe end and recess 16 of sleeve 11 which interaction provides resistance against blowout of the plug once under fluid pressure which will normally be applied axially against collar 4. The flange is formed when the end of a pipe is cut by a known cutting instrument which creates an inwardly directed annular flange which will locate in recess 16 when plug 1 is fully inserted.

Once plug 1 is fully inserted nut 15 is tightened and as this occurs threaded region 3 of shaft 2 is drawn out causing O ring 7 to be sandwiched between collar 4 and floating collar 10. This causes distortion in O ring 7 and increases the frictional effect between O ring 7 and the inner wall of the pipe. This in conjunction with the engagement of recess 16 with a peripheral flange on the pipe end provides secure fitting of the plug to the pipe.

Referring to FIG. 4 there is shown a long sectional view through A—A of the plug of FIG. 3 inserted in a pipe 17. Pipe 17 includes an inwardly directed annular flange 18 about pipe end 17a. Plug 1 is shown fully inserted into pipe 17 with locking nut 15 tightened to its fullest extent such that O ring 7 is compressed between collar 4 and floating collar 10 such that a friction sealing is created between inner wall 17a and O ring 7. In addition, the engagement between the flange 18 and recess 16 increases the resistance to unwanted blowing out of the plug under pressure, thereby reducing significantly complete reliance on friction to ensure proper engagement of plug 1. Whilst each pipe end will usually be plugged only once each plug may be used repeatedly.

Figure 5:
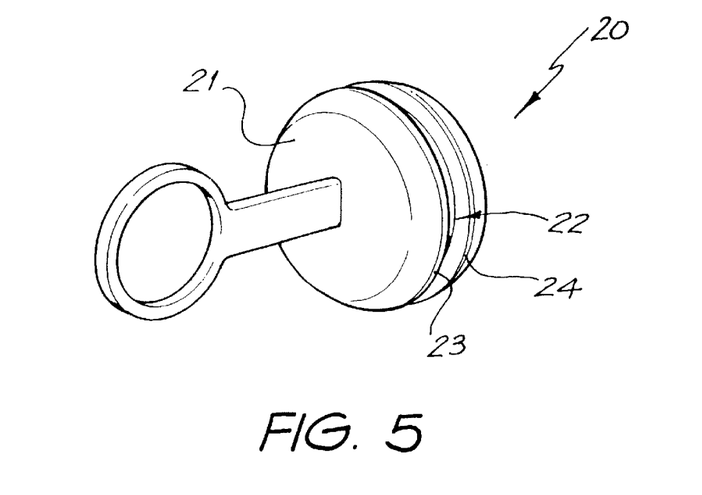
FIG. 5: shows an isometric view of a plug according to an alternative embodiment.
Figure 6:
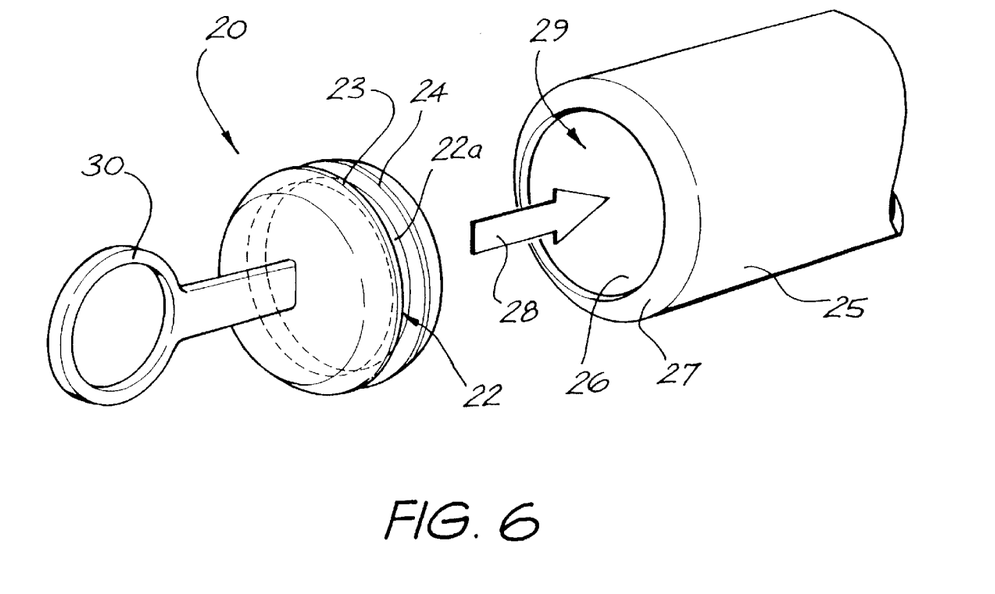
FIG. 6: shows an exploded view of the plug of FIG. 5 and pipe arrangement.

Referring to FIG. 5 there is shown a resiliently deformable plug 20 for insertion in an opening in a pipe, according to an alternative embodiment. Plug 20 comprises a generally disc shaped body 21 having disposed peripherally thereabout a recess or groove 22 which receives a flange formed in a pipe to which the plug will be affixed (see FIG. 6). Groove 22 comprises walls 23 and 24 which may be formed by a bifurcation formed in body 21 terminating in walls 23 and 24 and which are integral with body 21. Groove 22 preferably extends about the full circumference of plug 20 thus walls 23 and 24 are co-extensive therewith. The plug is preferably manufactured from such materials as to ensure that the walls are elastically deformable to an extent which enables the plug to clear the inwardly directed flange (see FIG. 6). Referring to FIG. 6 there is shown an exploded view of a plug and pipe arrangement. The plug shown in FIG. 6 corresponds to that shown in FIG. 5 and is numbered accordingly. FIG. 6 shows a typical pipe end 25 which will receive plug 20 in order to pressure seal the pipe. The need to seal pipes in the way to be described generally occurs in plumbing applications, an example of which is where a plumber may not have completed a job and wishes to temporarily seal a pressurised fluid pipe. When installing water pipes, a plumber may terminate a pipe emanating from a wall or like structure by crimping the end of the pipe followed by welding in order to effect a temporary seal. When the plumbing work is to be re-commenced the plumber must cut the crimped portion from the end of the pipe in order to install the finished fitting on the end of the pipe. This methodology is time consuming and requires oxy acetylene equipment which is costly and inconvenient. The plug according to the present invention eliminates the need for use of the oxy acetylene equipment and also precludes the need for crimping.

According to the sealing arrangement shown in FIG. 6, the pipe end to be sealed may be cut with a roller cutter providing a finish on the end of the pipe which receives and retains the plug in addition to frictional retention between the plug and the inner wall of the pipe. Pipe end 25 shown in FIG. 6 includes a flange 27 disposed radially inwards which is formed consistently around the inner circumference of the pipe and forms a shoulder which engages plug 20.

The engagement takes place in the following manner. After preparation of the pipe end which essentially involves cutting with a roller cutter such that internal shoulder or flange 27 is created by use of a cutting wheel or the like, the plumber inserts plug 20 into opening 29 in the direction of arrow 28. Fitting takes place by simply pressing the plug 20 against flange 27 which results in deformation of wall 24 so that flange 27 locates in groove or recess 22 opposing groove bottom 22a. Selection of the material used for the plug is important as insertion relies on the ability of the plug material to resiliently deform in response to pressing against flange 27. Whilst it is preferable that flange 27 be formed evenly around the periphery of opening 29 of pipe end 25, the plug will still be retained in position even where the flange is inconsistently formed around the pipe's circumference. If cutting of the pipe end is effected by a roller cutter, it is predictable that the so formed flange will be consistent throughout the circumference of the pipe. When plug 20 is in engagement with pipe end 25, wall 24 impinges on inner surface 26 of pipe end 25 thereby creating a form of frictional engagement assisting the ability of the plug to resist pressures exerted by the fluid in the pipe. Wall 23 sits external of the pipe and provides a shoulder 23a (see FIG. 7) which prevents unwanted insertion of plug 20 inside pipe 25 beyond flange 27. This arrangement removes the reliance of frictional engagement between the plug and the wall to provide the seal. One advantage of the arrangement described is that the pipe is not damaged from mechanically applied pressures and the flange created by the cutting wheel allows adequate resistance against pressure blow out. Suitable materials for manufacture of the plug would include (neoprene rubber). According to the embodiments shown in FIGS. 5 and 6, plug 20 is adapted with a finger grippable formation extending from the plug which enables the user to easily remove the plug from pipe end 25 or break the seal created.

Figures 7, 8:
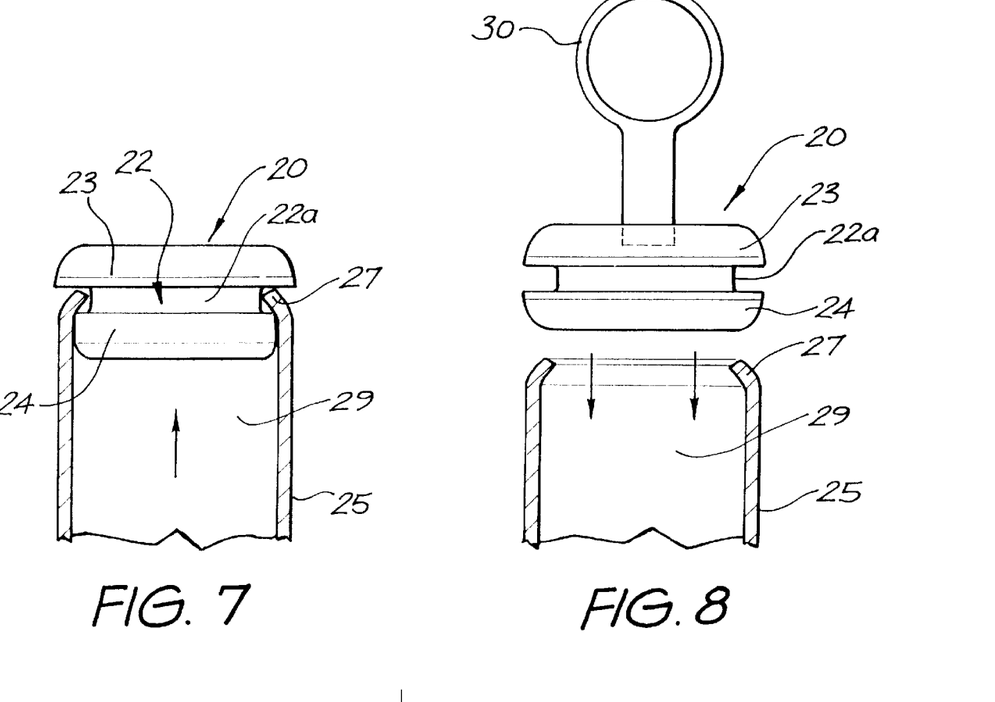
FIG. 7: shows a long sectional view of the plug of FIG. 5 fully installed in a pipe end.
FIG. 8: shows a long sectional view of the arrangement of FIG. 5 wherein the plug includes a finger grippable handle.

Referring to FIG. 7 there is shown a long sectional view of a plug similar to that described in FIGS. 5 and 6 (absent finger grippable formation 30 ) inserted in a pipe. The arrangement of FIG. 7 has been assigned numbers which correspond to the numbering of FIG. 6. From the long sectional view shown in FIG. 7 it can be seen that flange 27 comprises a return portion integral with pipe end 25 formed by a cutting wheel. Flange 27 is formed by a burr about the end of the pipe as a consequence of cutting.

FIG. 8 shows the arrangement of FIG. 7 with plug 20 removed from pipe end 25. Numbering used in FIG. 8 corresponds to that used in FIG. 7 for like integers. As shown in FIG. 8, plug 20 is removed from the pipe end 25 by means of finger grippable formation 30. Plug 20 is reusable with the life of the seal depending upon the number of times it is used and the material forming the seal.

Figure 9:
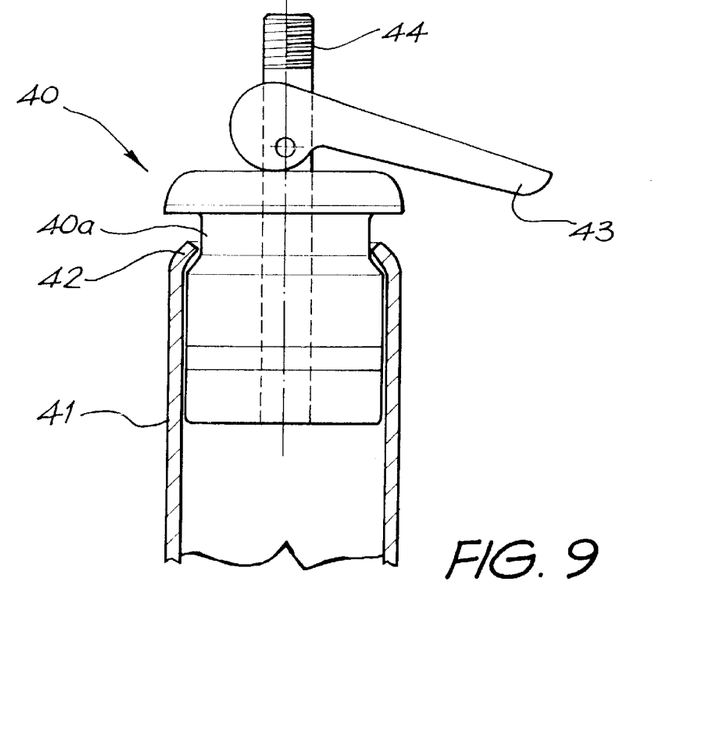
FIG. 9: shows an alternative embodiment of the invention wherein the plug includes means to enable detachable attachment of a testing apparatus.

Referring to FIG. 9 there is shown an alternative embodiment of the invention. FIG. 9 shows a modified bottle plug 40 inserted in pipe end 41. The bottle stopper includes a shoulder region 40a which in use abuts flange 42 in order to resist unwanted blowing out. With this arrangement an opening is formed in the modified bottle stopper and includes threaded end 44 to which can be attached an apparatus to enable testing of pressures in the pipe when the seal is in position. Handle 43 facilitates sealing and release of plug 40.

It is envisaged that with the arrangements described above, a pipe having a pressure of 500–800 kilopascals (72 psi to 120 psi) can be temporarily sealed with the plug arrangements described.

Figure 10:
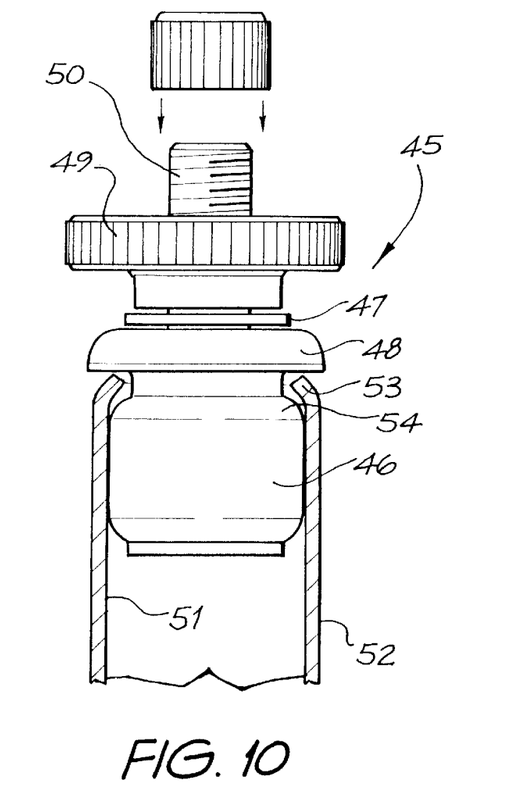
FIG. 10: shows a cross sectional elevation of a plug arrangement according to an alternative embodiment.

Referring to FIG. 10 there is shown an alternative arrangement for sealing an end of a pipe. The arrangement comprises plug assembly 45 comprising an elastic rubber seal 46, a washer 47 and collar 48.

The assembly further comprises a nut 49 (preferably a wing nut) which when rotated about threaded shaft 50 urges washer 47 against rubber seal 46, causing seal 46 to laterally expand against inner surface 51 of pipe 52. Pipe 52 includes annular flange 53 which is introduced into the pipe by cutting and which prevents unwanted blow out of assembly 45 by virtue of engagement between shoulder 54 and flange 53. The more nut 49 is turned, the tighter the frictional engagement between seal 46 and surface 51 as threaded shaft 50 is drawn further away from the pipe opening.

Figure 11:
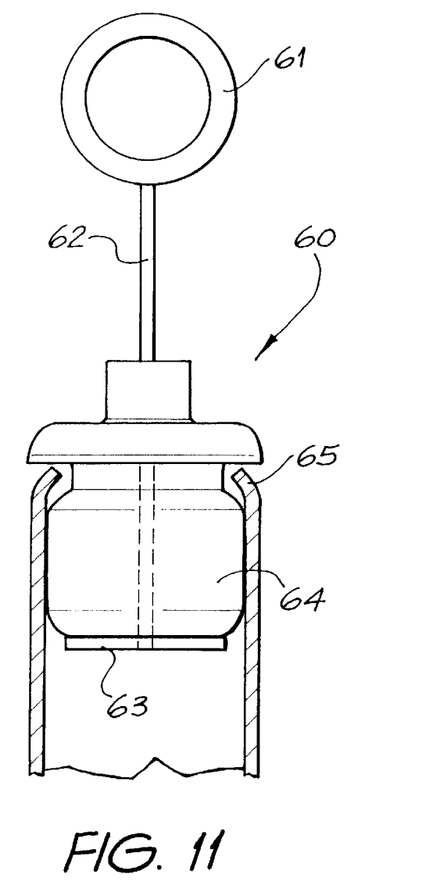
FIG. 11: shows a cross sectional elevation of an alternative plug arrangement including finger grippable handle.

FIG. 11 shows an alternative sealing arrangement based on the operating principle employed in the arrangement of FIG. 10. Assembly 60 includes a finger grippable handle 61 connected to cord 62 which in turn is connected to base 63. As handle 61 is pulled base 63 is urged against rubber seal 64 which expands to seal the pipe relying partly on frictional engagement but primarily on resistance to popping out of assembly 60 by flange 65.

To accommodate pipes of different sizes the sealing plugs or plug assemblies may be stepped such that appropriate plug selection can be made according to the internal diameter of the pipe.

A significant advantage of the invention in both its apparatus and method aspects is that the tradesman can leave the job temporarily with the system safely under test and continue conveniently from where the job finished and without any material wastage. The tradesman can also rest assured that no unwanted foreign matter will enter the pipe.

It will be recognised by persons skilled in the art that numerous variations and modifications may be made to the invention as described herein being a sealing plug which acts against an internal flange, and does not rely on mechanical friction to prevent blow out without department from the overall spirit and scope of the invention.

What is claimed is:

1. A releasable plug for sealing an open end of a fluid bearing pipe having at its open end an inwardly directed flange formed upon cutting an end of said pipe, said plug comprising a plug body, an annular recess formed in the body which engages said flange, and a seal which frictionally engages an inner surface of said pipe thereby providing a pressure seal for said pipe, wherein upon insertion of said body into said open end, the recess engages the flange to prevent unwanted release of the plug from the pipe.

2. A plug according to claim 1 wherein the plug comprises an elongated shaft including at a first end a threaded region and at a second end a collar, a sleeve surrounding said elongated shaft and including at one end a collett and at a second end an abutment surface wherein a seal is provided between said abutment surface and said collar, and wherein, the sleeve further comprises a recess at or near said collet which receives said flange thereby providing resistance against unwanted release of said plug from said open end of said pipe.

3. A plug according to claim 2 wherein said threaded region includes a nut which when rotated in a first direction upon insertion of said plug in the pipe end engages a surface of said collett, urging said sleeve towards said collar thereby activating said seal such that said seal frictionally engages the inner wall of said pipe.

4. A plug according to claim 3 wherein said seal comprises a rubber O ring.

5. A plug according to claim 4 wherein said elongated shaft moves relative to said sleeve upon rotation of said nut.

6. A plug according to claim 5 wherein the shaft further comprises a tapered region intermediate said threaded portion and said collar.

7. A plug according to claim 6 wherein the sleeve includes a tapered region which corresponds to and cooperates with the tapered region on the shaft.

8. A plug according to claim 7 wherein, said rotation of said nut causes said O ring to be compressed between said collar and said sleeve.

9. A plug according to claim 8 further including a floating collar between the O ring and the threaded region on said elongated shaft such that upon rotation of said nut said O ring is compressed between an inner surface of said collar and an inner surface of said floating collar.

10. A plug according to claim 9 wherein said shaft further comprises between said tapered region and said collar a recess which receives and retains said O ring.

11. A plug according to claim 10 wherein the recess between the tapered region and the collar is wider than the thickness of the O ring.

12. A plug according to claim 11 wherein the tapered region on the shaft begins at the threaded portion and terminates at the recess.

13. A plug according to claim 12 wherein the floating collar is able to move longitudinally over the length of the tapered region.

14. A plug according to claim 13 wherein the internal diameter of the sleeve is wider than the external diameter of the threaded portion of the shaft so as to enable the sleeve to move rotatably and longitudinally relative to said shaft.

15. A plug according to claim 14 wherein the nut, shaft, floating collar and sleeve are made from a plastics material.

16. A plug according to claim 15 wherein the recess on said sleeve is annular and adjacent said collett.

17. A plug according to claim 16 wherein the plug can be disassembled and reassembled.

18. A plug according to claim 17 wherein the collett and nut are annular.

19. A method for releasably sealing an end of a pipe comprising:
   (a) cutting the end of a pipe to be sealed so as to form a flange about the end of the pipe extending radially inwards from an inner surface of the pipe;
   (b) taking a sealing device comprising a plug body, an annular recess formed in the body and which engages said flange, and a seal which frictionally engages an inner surface of said pipe thereby providing a pressure seal for said pipe; and
   (c) inserting the device into an opening in said cut end such that said annular recess engages said flange thereby sealing the pipe and providing resistance against unwanted expulsion of said sealing device from said pipe end when said pipe contains a pressurized fluid.

20. A method for sealing the end of a pipe with a removable plug comprising:
   (a) taking a plug comprising a shaft having a threaded end and at an opposite end a collar, a recess including a seal, a sleeve adapted to slide along the shaft, and a nut engaging said thread;
   (b) inserting said plug into an end of a pipe to be sealed such that an inwardly directed flange on the pipe engages said recess formed in said sleeve.

21. A plug according to claim 1 wherein said plug body is deformable and has disposed peripherally thereabout said annular recess which when said plug is inserted in said opening receives said flange such that at least one wall of said recess engages either one or both surfaces of the flange and/or the inner surface of the pipe to effect sealing between the plug and pipe.

22. A plug according to claim 21 wherein the plug comprises;
  a generally disc shaped body with the recess formed by a bifurcation in the body near the circumferential region said bifurcation terminating in two resiliently deformable wall members such that the disc is generally H shaped in cross section.

23. A plug according to claim 1 wherein the plug body includes;
  a shaft having at one end a threaded portion which receives a nut and at an opposite end an expansible rubber element, a collar engaging the end of said pipe, a recess which receives said flange; wherein when said nut is tightened against said collar said rubber element expands to frictionally engage the inner surface of the pipe said frictional engagement and engagement between said flange and recess preventing unwanted withdrawal of the plug from the pipe.

* * * * *